(12) United States Patent
Blanc

(10) Patent No.: US 7,472,648 B2
(45) Date of Patent: Jan. 6, 2009

(54) DEVICE FOR SEPARATING THE STALKS OF FRUIT, GROUPED TOGETHER IN CLUSTERS, FROM ONE ANOTHER

(75) Inventor: Philippe Blanc, Montauban (FR)

(73) Assignee: Materiel pour l'Arboriculture Fruitiere, Montauban (FR)

( * ) Notice: Subject to any disclaimer, the term of this patent is extended or adjusted under 35 U.S.C. 154(b) by 126 days.

(21) Appl. No.: 11/730,833

(22) Filed: Apr. 4, 2007

(65) Prior Publication Data

US 2007/0259705 A1 Nov. 8, 2007

(30) Foreign Application Priority Data

Apr. 5, 2006 (FR) .................................. 06 02989

(51) Int. Cl.
*A23N 15/02* (2006.01)
*A01D 45/00* (2006.01)
(52) U.S. Cl. .............................. 99/637; 99/638; 99/643; 99/537; 99/538; 460/123; 460/125; 460/126; 15/3.13; 15/3.11
(58) Field of Classification Search .................... 99/643, 99/638, 637, 537, 538; 460/123, 125, 126; 15/3.11, 3.13

See application file for complete search history.

(56) References Cited

U.S. PATENT DOCUMENTS 3,918,116 A 11/1975 Valdespino

FOREIGN PATENT DOCUMENTS

| FR | 2820287 | 8/2002 |
| WO | 2005/110628 | 11/2005 |

*Primary Examiner*—Shawntina Fuqua
(74) *Attorney, Agent, or Firm*—Young & Thompson

(57) ABSTRACT

Device for separating the stalks of fruit such as cherries, grouped together in clusters, from one another at their joining point, includes at least one hydraulic circuit including a tank (1) receiving the fruit to be treated; a centrifugal pump (2) connected to the tank for sucking up the liquid and the fruit therefrom; and at least one filtration device (3) receiving the liquid and the fruit discharged by the pump and capable of separating the fruit from the liquid. The tank has a base (4) which converges downwards as far as a lower outlet orifice (5) of this tank. The pump includes a housing (7) and at least one pumping wheel (9) guided in rotation relative to the housing along an at least substantially vertical axis (10) of rotation, and the pump has an axial suction inlet (11) connected below the lower outlet orifice.

20 Claims, 4 Drawing Sheets

Figure 1:
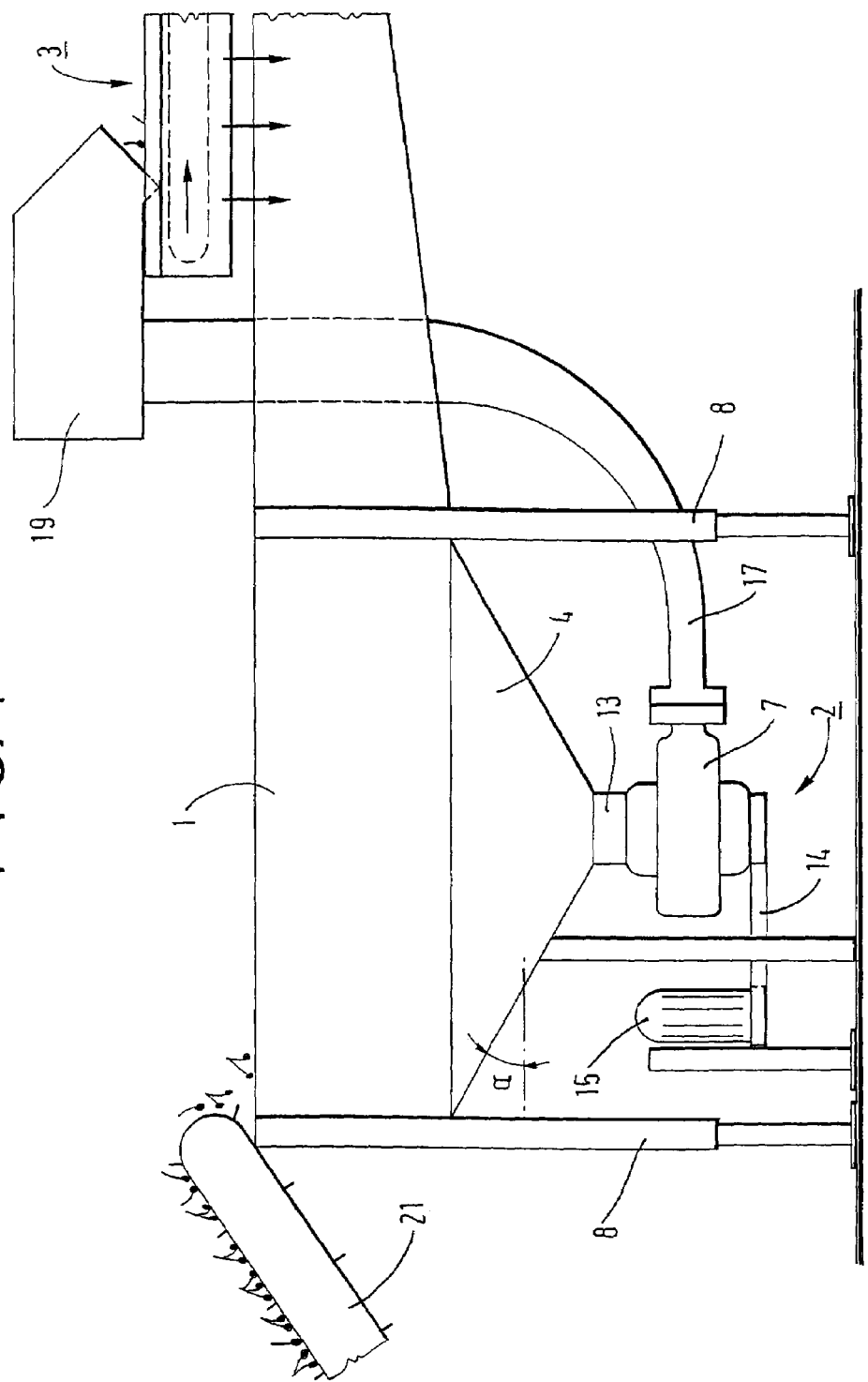

DEVICE FOR SEPARATING THE STALKS OF FRUIT, GROUPED TOGETHER IN CLUSTERS, FROM ONE ANOTHER

The invention relates to a device for separating the stalks of fruit such as cherries, grouped together in clusters, from one another at their joining point. Such a device allows the fruit to be automatically separated in order to isolate them which then allows the sorting and/or packaging operations to be facilitated.

FR 2820287 has already disclosed such a device comprising a tank with a base which is inclined as far as a lower lateral outlet orifice connected to a centrifugal hydraulic pump of which the axis, as that of the orifice, is horizontal. The discharge pipe of the pump returns the water and the fruit to an element for collecting and distributing the cherries after separation. This document teaches that, in specific conditions, the use of the pump with a free passage section greater than 45 mm and at low speed, allows the stalks of the fruit to be separated due to the specific hydraulic stresses undergone by the fruit in the very centre of the pump.

Nevertheless, the adjustment of such a device poses a problem, especially when high treatment rates are desired. More specifically, so as not to damage the fruit, it is necessary to limit the speed of rotation of the pump to a very low value. From a certain rotational speed, a significant proportion of fruit comes into contact with the walls of the housing or wheel of the pump and is therefore damaged. However, if the speed of the pump is too low, the efficiency of the separation of the stalks is unsatisfactory, the proportion of unseparated stalks remaining high at the outlet of the pump.

The invention, therefore, aims to alleviate these drawbacks by proposing a device which makes it possible to ensure both high efficiency of the separation of the stalks, whilst minimising the risk of damaging the fruit, such that the proportion of damaged fruit at the outlet of the device is zero or negligible.

The invention also aims to propose such a device capable of achieving a high rate of treated fruit, in particular so as to be compatible with supplying industrial sorters, the treatment rate thereof being able to reach 2 t/h.

The invention aims, furthermore, to propose such a device which is simple and inexpensive in terms of manufacturing costs as well as usage costs.

To achieve this, the invention relates to a device for separating the stalks of fruit such as cherries, grouped together in clusters, from one another at their joining point, of the type comprising at least one hydraulic circuit, comprising:
- a main tank comprising a volume of neutral liquid and receiving the fruit to be treated,
- a centrifugal pump connected to the tank for sucking up the liquid and the fruit therefrom,
- and at least one downstream filtration device receiving the liquid and the fruit discharged by the pump and capable of separating the fruit from the liquid, wherein:
- the main tank has a base which converges downwards as far as a lower outlet orifice of this tank,
- the centrifugal pump comprises a housing and at least one mobile pumping wheel guided in rotation relative to the housing along an at least substantially vertical axis of rotation,
- the centrifugal pump has an axial suction inlet, connected below the lower outlet orifice.

In practice, the combination of features of the invention makes it possible to minimise the risks of contact of the fruit with the internal walls of the pump, in particular with those of its mobile wheel. More specifically, as the walls of the base of the tank are convergent, the fruit arrives in the region of the lower outlet orifice essentially on the periphery thereof, the proportion of fruit passing through the lower orifice in the vicinity of its vertical axis, being low, even zero. Thus the inventor has observed that the fruit passing through the suction inlet of a centrifugal pump on the periphery thereof is immediately driven radially towards the outside, with a low risk of coming into contact with the mobile wheel of the pump and the internal walls of the pump housing. The single fact of supplying the pump with fruit arriving essentially on the periphery of the suction inlet of this pump, allows improved results to be obtained while minimising the risks of damaging the fruit. Consequently, whatever the type of pump used, improved results are obtained with a pump arranged with its suction inlet on a vertical axis, below the lower outlet orifice of the tank with the convergent base, rather than with a pump arranged horizontally, with its suction inlet on a horizontal axis.

Advantageously and according to the invention, the wheel of the centrifugal pump extending immediately below the suction inlet is retracted relative to the suction inlet, an axial space being made between the housing of the pump and this wheel. In particular, advantageously and according to the invention, the centrifugal pump is a single-stage pump of the vortex type.

Moreover, advantageously and according to the invention, the wheel is mounted rotatably relative to the housing of the pump along a vertical axis coaxial with that of the suction inlet and the outlet orifice of the tank and this portion of the base is symmetrical relative to the axis of the lower outlet orifice. As a variant, there is nothing to prevent using a pump of which the axis of rotation of the wheel is not strictly aligned with the suction inlet. The inventor has, however, observed that the rate of damage to the fruit for a given speed of rotation, is lowest with a pump of which the suction inlet is axial.

Furthermore, advantageously and according to the invention, the base of the tank comprises a portion extending around and above the lower outlet orifice. In this manner, the fruit is distributed at least substantially uniformly on the periphery of the outlet orifice. It is noteworthy in this regard that the shape of the convergent walls of the base of the tank may be the subject of different variants, in particular according to the manner in which the fruit is itself supplied to the tank, so as to optimise the uniform distribution of the fruit on the periphery of the outlet orifice.

Furthermore, advantageously and according to the invention, the base of the tank comprises a portion extending around and above the lower outlet orifice, and this portion of the base is not a symmetrical body of revolution about the axis of the lower outlet orifice. For example, advantageously and according to the invention, said portion of the base of the tank is in the shape of a truncated pyramid. Such a shape, which is not a symmetrical body of revolution, makes it possible in particular to minimise the vortex or whirlpool movements of the liquid in the base of the tank, which could impair the uniform supply of the fruit on the periphery, relative to the axial suction inlet of the pump. However, advantageously and according to the invention, the lower outlet orifice of the tank has a cross-section which is a symmetrical body of revolution about its axis. Similarly, preferably and according to the invention, the axial suction inlet of the pump is a symmetrical body of revolution.

In a preferred embodiment, advantageously and according to the invention, a screen is arranged above the lower outlet orifice, suitable for forcing the fruit to pass through laterally on the periphery of the lower outlet orifice. This screen may be suspended on a frame extending above the tank. It is fixed at a vertical distance from the lower outlet orifice which is as low as possible, but sufficient not to impair the flow of liquid and fruit towards this orifice. Advantageously and according to the invention, this screen has walls which diverge downwards so as not to impair the flow of fruit downwards inside the tank. The walls of the screen may advantageously be symmetrical relative to the vertical axis of the outlet orifice, but are preferably not symmetrical bodies of revolution, as are the walls of the base of the tank. The screen may advantageously be of pyramidal shape with the top oriented upwards.

Moreover, the liquid is advantageously water but there is nothing to prevent using any other liquid suitable for the treatment of fruit, in particular of food-grade quality. It may, for example, be an antiseptic aqueous solution or the like.

Advantageously and according to the invention, the internal walls of the pump capable of coming into contact with the liquid transporting the fruit, are covered by a non-metallic, shock-resistant coating of lower hardness and roughness than those of a solid metal wall. Advantageously and according to the invention, the hardness and roughness of the shock-resistant coating are lower than those of the internal wall of the pump which it covers, which is generally a metal wall made by casting.

The device according to the invention allows the automatic separation of stalks of fruit from one another at their joining point, supplied continuously at a high rate to the inlet of the tank, for example by means of a conveyor in continuous motion, emptying the fruit into the upper part of the tank.

The invention also relates to a device characterised in combination by all or some of the features mentioned above or below.

Figure 2:
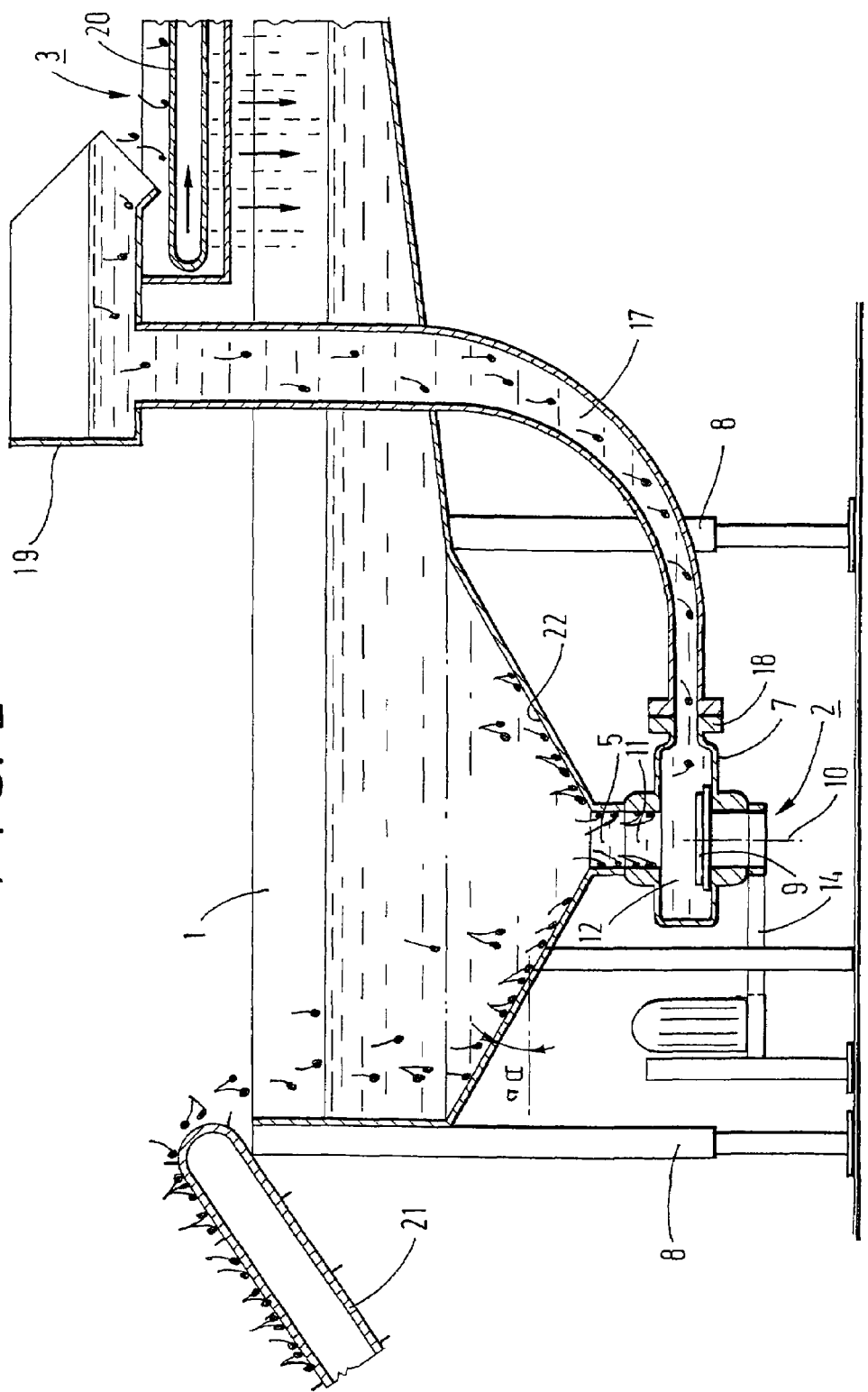
Figure 3:
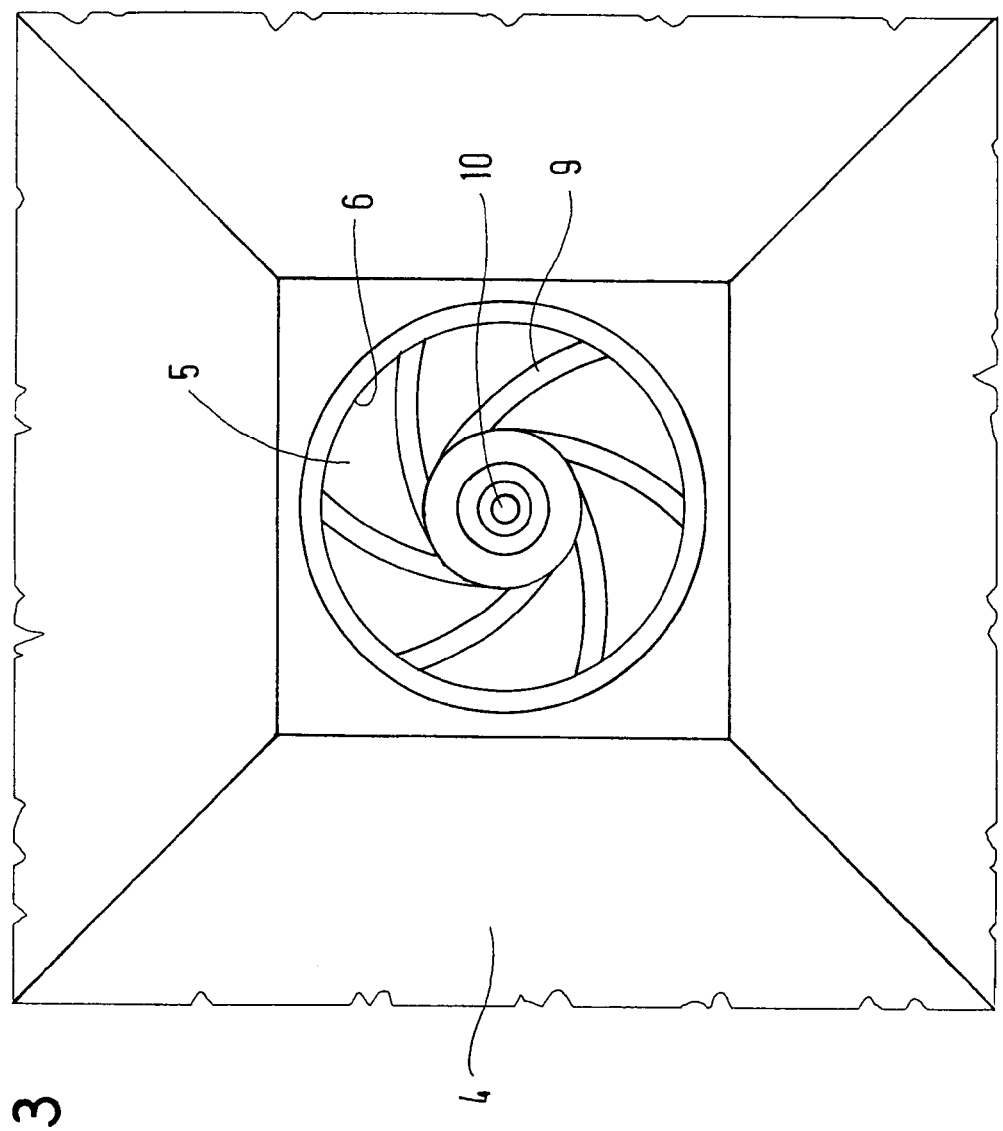
Figure 4:
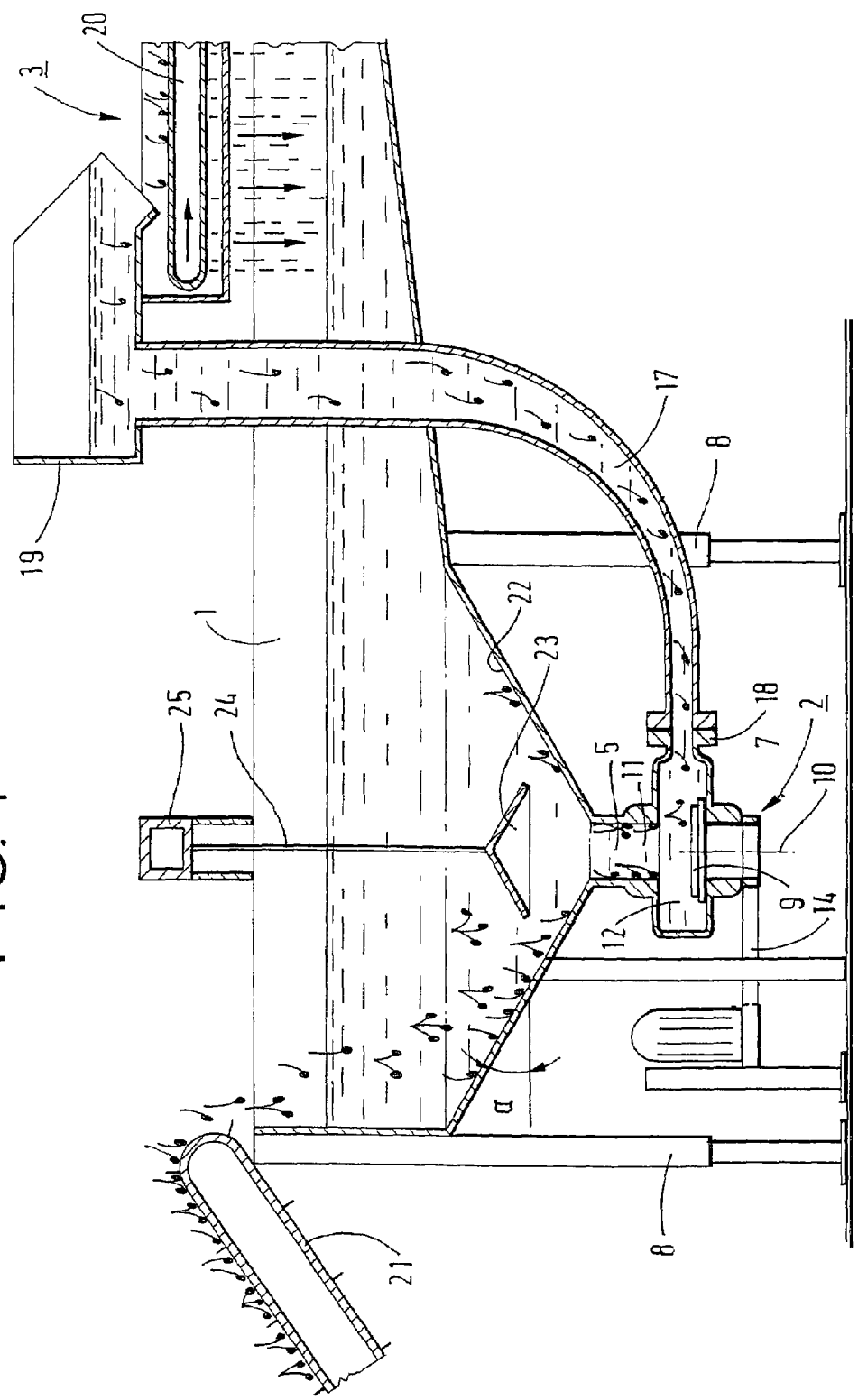

Further advantages, objects and features of the invention will become apparent from reading the following description which refers to the accompanying figures, in which:

FIG. 1 is a schematic elevation of a device according to a first embodiment of the invention, FIG. 2 is a schematic view in section through a vertical longitudinal plane of the device of FIG. 1, FIG. 3 is an enlarged schematic view from above of the base of the tank of the device of FIG. 1, illustrating in particular the lower outlet orifice, FIG. 4 is a schematic view in section through a longitudinal vertical plane of a second embodiment of the invention.

A device according to the invention firstly comprises a hydraulic circuit 1, 2, 3 comprising a main tank 1 containing a volume of neutral liquid such as water or a food-grade aqueous solution, a centrifugal pump 2 connected to the tank 1 to suck up the liquid and the fruit contained in this liquid, and a downstream filtration device 3 receiving the liquid and the fruit discharged by the pump 2, and suitable for separating the fruit from the liquid. The fruit is supplied continuously into the tank 1 by a conveyor 21 driven in continuous motion and emptying the fruit into the upper part of the tank 1.

The tank 1 is formed by a trough with walls made of metal or of rigid synthetic material, carried by a rigid frame resting on the ground by means of feet, such as at 8. The tank 1 has a base 4 which converges downwards, opening out into a lower outlet orifice 5 oriented along an at least substantially vertical axis (i.e. this lower outlet orifice 5 being defined by a free edge 6 of the wall of the base 4, this edge 6 extending in an at least substantially horizontal plane). The lower outlet orifice 5 constitutes the lowest point of the tank 1, towards which both the liquid contained in this tank 1 and the fruit which it contains converge.

The walls forming the base 4 of the tank 1 are thus inclined downwards as far as the orifice 5, with an inclined slope which is adapted so that the fruit contained in the liquid fall by gravity into the very centre of this liquid until coming into contact with these base walls 4, before reaching the outlet orifice 5, on the periphery thereof. In practice, the angle of inclination $\alpha$ of the base walls 4 relative to the horizontal is preferably between 15° and 60°—in particular in the order of 25° to 45°. In one preferred embodiment for the treatment of cherries and with a pump with the features mentioned below, this angle is in the order of 30°.

Moreover, the portion of the base 4 of the tank extending around and above the lower outlet orifice 5, is preferably symmetrical relative to the vertical axis of the lower outlet orifice 5. This being the case, other arrangements are possible, since they aim to allow the most uniform distribution possible of the fruit, essentially on the periphery of the outlet orifice 5. In contrast, this portion 22 of the base 4 is preferably not a symmetrical body of revolution about the axis of the lower outlet orifice 5, so as to prevent the creation of a whirlpool or a vortex in the tank 1 above the lower outlet orifice 5, a whirlpool or vortex which would be capable of preventing the arrival of fruit, essentially on the periphery of the outlet orifice 5. In the embodiment shown, the portion 22 of the base 4 arranged around and above the outlet orifice 5 is generally a truncated pyramid shape with four faces (i.e. with a rectangular base) with the top oriented downwards.

The pump 2 is a centrifugal pump which comprises a housing 7 fixed rigidly to the frame and at least one mobile pumping wheel 9 guided in rotation relative to the housing 7 along an axis 10 of rotation oriented at least substantially vertically when the housing 7 of the pump is fixed to the frame.

The pump 2 has, moreover, an axial suction inlet 11, arranged opposite the axis 10 of rotation of the wheel 9 and this suction inlet 11 has an axis of symmetry coaxial with the axis of rotation 10 of the wheel 9. Moreover, the wheel 9 which extends immediately below the suction inlet 11 is retracted relative to this suction inlet 11, an axial space 12 being made between the housing 7 of the pump 2 and this wheel 9. The suction inlet 11 is connected to the outlet orifice 5 of the tank 1, below this outlet orifice 5, by a suction pipe 13 which is as short as possible, i.e. having a minimum length to allow, in practice, the connection between the pump 2 and tank 1 to be created. The axis 10 of rotation of the wheel 9, in addition to that of the suction inlet 11, the suction pipe 13 and the outlet orifice 5 are merged and oriented vertically.

The centrifugal pump 2, for example, is a single-stage pump (with a single wheel 9) of the vortex type, the wheel 9 being mounted to be axially retracted. It may, in particular, be a pump marketed under the trade name SEWABLOC® F100-250 by the firm KSB (Cenon, France or www.ksb.com) achieving a rate of 100 m³/h for a height of 12 meters.

The shapes and radial dimensions of the outlet orifice 5 of the tank, the suction pipe 13 and the suction inlet 11 of the pump 2 are suitable for freely allowing the passage of liquid and fruit. More particularly, these dimensions have to be sufficient so that the fruit arrives at the outlet orifice 5 and circulates in the suction pipe 13 and in the suction inlet 11, essentially on the periphery of the orifice 5, the pipe 13 and the inlet 11 such that they arrive in an area of the axial space 12 remote from the vertical axis 10 of rotation of the wheel 9. Consequently, the fruit is immediately carried along radially by the current of liquid into the axial space 12 without coming into contact with the walls of the wheel 9. Furthermore, the radial distance which it has to cover inside the axial space 12 is limited, less than it would have to cover if it arrived in the region of the axis 10. As a result, for a pump 2 of given dimensions and performance, the proportion of fruit at risk of coming into contact with the internal walls of the housing of this pump is minimised. At the outlet of the pump 2 the stalks of the fruit are separated from one another, the fruit no longer being in clusters, but isolated.

Advantageously, the outlet orifice 5, the suction pipe 13 and the suction inlet 11 of the pump 2, have a cross-section which is a symmetrical body of revolution about the axis 10 of rotation of the wheel 9, and a diameter greater than 50 mm, in particular between 50 mm and 180 mm, for example in the order of 110 mm. Furthermore, the axial space 12 advantageously has a height greater than 30 mm, in particular between 30 mm and 180 mm, for example in the order of 100 mm.

The pump 2 is driven in rotation by a belt 14, itself coupled to an electric motor 15 fixed to a support 16 resting on the ground. This belt 14 is directly coupled at the end of the shaft to the wheel 9. The pump 2 discharges the liquid and the fruit into a discharge pipe 17 via a discharge outlet 18 of the pump housing 7 arranged on the periphery thereof, oriented along a horizontal radial axis. The discharge pipe 17 extends, therefore, horizontally and radially from the pump housing 7, and is bent upwards to extend above the tank 1 which it passes through (via a sealed conduit of the base 4) as far as a discharge tank 19 where it discharges. Preferably, this discharge pipe 17 has a cross-section which increases from the discharge outlet 18 of the pump 2, as far as the discharge tank 19, such that the liquid and the fruit circulate in this pipe 17 at a reducing speed. Ideally, the fruit arrives in the discharge tank 19 at a speed which is as low as possible. In this manner, the risks of impact and damage to the fruit are minimised. The tank 19 comprises a horizontal base and lateral walls and is open at the top and suitable for being able to contain a specific volume of liquid and fruit for emptying them gently onto a filtration conveyor 3. This conveyor 3 is driven in continuous motion and has a perforated conveyor belt 20 suitable for holding the fruit and allowing the liquid to pass vertically from top to bottom by gravity through the entire conveyor 3. The fruit is, therefore, carried along by the belt 20 into the outlet of the device and the liquid returns to the tank 1 which has a base portion immediately below the filtration conveyor 3 to collect this liquid.

Moreover, advantageously, the internal walls of the pump 2 which are capable of coming into contact with the liquid transporting the fruit and against which the fruit is thus capable of striking, are covered by a non-metallic, shock-resistant coating of lower hardness and roughness than those of a solid metal wall (in particular of lower hardness and roughness than those of the wall which it covers). In particular, the internal walls of the wheel 9 and the edges of the internal walls of the pump are covered by a shock-resistant coating. In this manner, if a fruit comes into contact with an internal wall covered by a shock-resistant coating, it undergoes less damage. Such a shock-resistant coating may be formed from a polymeric composite marketed under the trade name PLASCOAT® PPA 571 by the firm PLASCOAT SYSTEMS LTD (Farnham, UK), applied in accordance with the requirements of the supplier after dismantling the pump, by hot dipping the parts to be treated in a polymeric alloy powder and curing in an oven. This shock-resistant coating may be made so as to have, for example, a thickness of between 500 μm and 1500 μm.

The embodiment of FIG. 4 is similar to that of FIG. 1 but differs in the addition of a screen 23 arranged above the lower outlet orifice 5, this screen 23 being suitable for forcing the fruit to pass through laterally on the periphery of the lower outlet orifice 5, without taking a path aligned with the vertical axis 10 or in the vicinity of this axis 10. The screen 23 is formed by a solid plate preferably forming walls which diverge downwards, arranged above the orifice 5 to mask said orifice, at a height suitable for allowing the passage of fruit between the free extreme edges of this screen 23 and the base wall 4 opposite, as shown in FIG. 4. The passage section left free by the screen 23 has to be of sufficient size, and in particular greater than that of the outlet orifice 5. In the example shown in FIG. 4, the screen 23 has a general pyramidal or conical shape. Advantageously, its shape in cross-section may be conjugate with that of the base 4 of the tank 1. This is, however, not obligatory, with nothing preventing the provision of a screen 23, for example, of conical shape whilst the base 4 is in the shape of a truncated pyramid. Be that as it may, the shape of the screen 23 has to be selected so as not to risk the fruit being held in suspension on this screen 23. The screen 23 is suspended on a support 24 extending vertically upwards, itself supported by a frame 25 fixed to the lateral walls of the tank 1 at the upper part thereof.

It goes without saying that the invention may form the subject of numerous variants relative to the embodiments disclosed above and shown in the Figures. The materials used may be various, whether metallic or not. A plurality of hydraulic circuits may be used on the same separating device. A plurality of filtration devices 3 may be provided at the outlet of the same pump 2. In every case, each pump 2 is arranged below an outlet orifice 5 of a tank 1 with its vertical axis of rotation, the base 4 of the tank, which converges towards this orifice 5, supplying the pump 2 with fruit arriving essentially on the periphery of the outlet orifice 5 and the suction inlet 11 of the pump 2.

The invention claimed is:

1. Device for separating the stalks of fruit such as cherries, grouped together in clusters, from one another at their joining point, of the type comprising at least one hydraulic circuit comprising:
   a main tank comprising a volume of neutral liquid and receiving the fruit to be treated,
   a centrifugal pump connected to the tank for sucking up the liquid and the fruit therefrom,
   and at least one downstream filtration device receiving the liquid and the fruit discharged by the pump and capable of separating the fruit from the liquid,
wherein:
   the main tank has a base which converges downwards as far as a lower outlet orifice of this tank,
   the centrifugal pump comprises a housing and at least one mobile pumping wheel guided in rotation relative to the housing along an at least substantially vertical axis of rotation,
   the centrifugal pump has an axial suction inlet connected below the lower outlet orifice.

2. Device as claimed in claim 1, wherein the wheel of the centrifugal pump extending immediately below the suction inlet is retracted relative to the suction inlet, an axial space being made between the housing of the pump and this wheel.

3. Device as claimed in claim 2, wherein the centrifugal pump is a single-stage pump of the vortex type.

4. Device as claimed in claim 1, wherein the wheel is mounted rotatably relative to the housing of the pump along a vertical axis coaxial with that of the suction inlet and the outlet orifice of the tank.

5. Device as claimed in claim 1, wherein the base of the tank comprises a portion extending around and above the lower outlet orifice and this portion of the base is symmetrical relative to the lower outlet orifice.

6. Device as claimed in claim 1, wherein the base of the tank comprises a portion extending around and above the lower outlet orifice and this portion of the base is not a symmetrical body of revolution about the axis of the lower outlet orifice.

7. Device as claimed in claim 6, wherein said portion of the base of the tank is in the shape of a truncated pyramid.

8. Device as claimed in claim 1, wherein the lower outlet orifice of the tank has a cross-section which is a symmetrical body of revolution about its axis.

9. Device as claimed in claim 1, wherein it comprises a screen arranged above the lower outlet orifice suitable for forcing the fruit to pass through laterally on the periphery of the lower outlet orifice.

10. Device as claimed in claim 1, wherein the screen has walls which diverge downwards.

11. Device as claimed in claim 1, wherein the internal walls of the pump capable of coming into contact with the liquid transporting the fruit are covered by a non-metallic, shock-resistant coating of lower hardness and roughness than those of a solid metal wall.

12. Device as claimed in claim 11, wherein the hardness and roughness of the shock-resistant coating are lower than those of the internal wall of the pump which it covers.

13. Device as claimed in claim 2, wherein the wheel is mounted rotatably relative to the housing of the pump along a vertical axis coaxial with that of the suction inlet and the outlet orifice of the tank.

14. Device as claimed in claim 2, wherein the base of the tank comprises a portion extending around and above the lower outlet orifice and this portion of the base is symmetrical relative to the lower outlet orifice.

15. Device as claimed in claim 2, wherein the base of the tank comprises a portion extending around and above the lower outlet orifice and this portion of the base is not a symmetrical body of revolution about the axis of the lower outlet orifice.

16. Device as claimed in claim 2, wherein said portion of the base of the tank is in the shape of a truncated pyramid.

17. Device as claimed in claim 2, wherein the lower outlet orifice of the tank has a cross-section which is a symmetrical body of revolution about its axis.

18. Device as claimed in claim 2, wherein it comprises a screen arranged above the lower outlet orifice suitable for forcing the fruit to pass through laterally on the periphery of the lower outlet orifice.

19. Device as claimed in claim 2, wherein the screen has walls which diverge downwards.

20. Device as claimed in claim 2, wherein the internal walls of the pump capable of coming into contact with the liquid transporting the fruit are covered by a non-metallic, shock-resistant coating of lower hardness and roughness than those of a solid metal wall.

* * * * *